United States Patent [19]

Shiratori et al.

[11] 4,148,503
[45] Apr. 10, 1979

[54] INFLATING TYPE OCCUPANT RESTRAINT DEVICE

[75] Inventors: Harunori Shiratori, Toyota; Yoshio Yamazaki, Aichi; Takaharu Yoshimi, Okazaki; Junichi Hori, Toyota, all of Japan

[73] Assignees: Toyota Jidosha Kogyo Kabushiki Kaisha, Toyota; Toyoda Gosei Co., Ltd., Nagoya, both of Japan

[21] Appl. No.: 729,848

[22] Filed: Oct. 5, 1976

[30] Foreign Application Priority Data

Mar. 26, 1976 [JP] Japan .................................. 51-34076

[51] Int. Cl.² ............................................ B60R 21/08
[52] U.S. Cl. ..................................................... 280/731
[58] Field of Search ............... 280/731, 728, 729, 730, 280/732, 734, 735, 736, 737, 738, 739, 740, 741, 742

[56] References Cited

U.S. PATENT DOCUMENTS

| | | | |
|---|---|---|---|
| 3,618,974 | 11/1971 | Chute | 280/741 |
| 3,622,176 | 11/1971 | Byer | 280/731 X |
| 3,656,791 | 4/1972 | Truesdell | 280/734 X |
| 3,663,035 | 5/1972 | Norton | 280/734 |
| 3,819,205 | 6/1974 | Dunford | 280/731 |
| 3,984,126 | 10/1976 | Goetz | 280/731 X |
| 4,026,580 | 5/1977 | Wulf | 280/736 |

*Primary Examiner*—John P. Silverstrim
*Attorney, Agent, or Firm*—Stevens, Davis, Miller & Mosher

[57] ABSTRACT

A receiving case for receiving a gas bag is formed of a side wall portion secured to a fixed member and a lid surface portion thinner than the side wall portion by the use of a material having a comparatively high hardness and a ductility. Further, the lid surface portion is formed with fragile portions contiguous to one another. At the inflation of the gas bag, the receiving case for the gas bag is prevented from scattering in the form of broken pieces, and the gas bag is prevented from being damaged by a sharp edge otherwise arising at the fracture surface of the receiving case.

1 Claim, 3 Drawing Figures

INFLATING TYPE OCCUPANT RESTRAINT DEVICE

This invention relates to an inflating type occupant restraint device in an automobile or the like wherein a gas bag inflates suddenly in case of an accident or collision etc. so as to restrain an occupant onto the seat side and to thus protect the occupant from a secondary collision against an instrument panel etc.

With some conventional occupant restraint devices, the lid body of the receiving case for the gas bag scatters at the inflation of the gas bag, and an occupant is fearful of being hurt by the broken pieces. For this reason, in devices in which the gas bag is received in the central portion of a steering wheel, a tough net made of synthetic resin fiber or a wire gauze is buried between constituent elements of a steering pad being the lid portion of the receiving case in order to previously form a fragile portion prone to rupture. Alternatively, a fixture coupled by a hinge with the peripheral wall portion of the receiving case is buried. Thus, the receiving case is ruptured from the fragile portion so as to prevent the scattering of broken pieces.

Such structures are naturally complicated, and are difficult to mold. In addition, the amount of the material used is large. Since the lid portion needs be formed with fragile portions for fracture with slits or thin-walled portions or with portions being weak relative to the remaining part on the basis of a material structure or a material construction, depressions are formed at the fracture portions on account of contraction in the manufacture of the synthetic resin material, and the external appearance is spoiled. Since the restraint device is installed within a limited space, the receiving volume for the gas bag becomes smaller by the increased volume of the lid portion.

Especially in the type of vehicle in which the occupant restraint device including the gas bag etc. is received in the central portion of the steering wheel, the inertial moment of the steering wheel system is increased by the weight of the occupant restraint device, and the return of the steering wheel is impaired. As a result, adverse effects are apparent in the maneuverability of the vehicle such as yawing, rolling etc., and the hub of the steering wheel becomes large, tending to degrade the visual inspection of the instruments. There has been a long standing need for an occupant restraint device which does not involve the disadvantages described above and which is free from the scattering of the lid portion of the receiving case.

Among the objects of this invention are to provide an inflating type occupant restraint device wherein the receiving case of a gas bag does not scatter at the inflation of the gas bag, to provide an inflating type occupant restraint device wherein the gas bag is not damaged by a sharp edge at the fracture surface of the receiving case, and to provide an extraordinarily stable and reliable, inflating type occupant restraint device wherein the receiving case is fractured at predetermined places under any service conditions.

These and other advantages and features of this invention will become apparent from the following description taken with reference to the accompanying drawings, in which.

Figure 1:
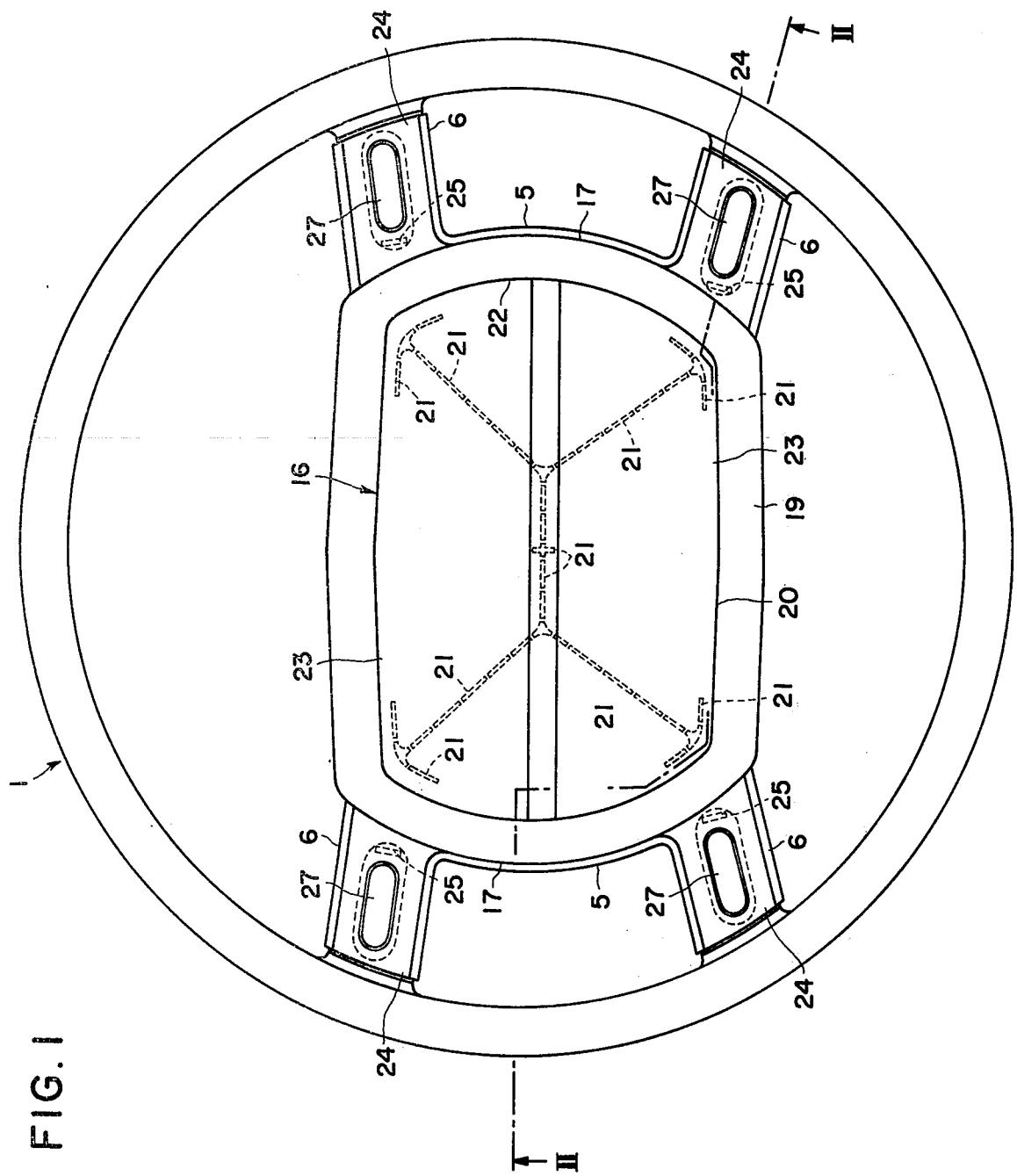
FIG. 1 is a plan view of an embodiment of this invention.

The embodiment shown in FIGS. 1 and 2 will now be described in detail. A bracket 3 is arranged at the central part of a steering wheel 1. The bracket 3 is secured to a spoke 2 of the steering wheel 1 through a bolt 7.

A gas generator 8 and a gas bag 10 are arranged at the central portion 4 of the bracket 3. The gas generator 8 is secured to the central portion 4 of the bracket 3 through a flange 9 and a bolt 11. The gas bag 10 is secured to the central portion 4 of the bracket 3 through the flange 9 and bolt 11 of the gas generator 8 and a retainer 12.

The gas bag 10 is arranged so as to surround the gas generator 8. It is received within a receiving case 16 in a foldedup state.

The receiving case 16 is molded in the shape of a beret-like body which includes a side wall portion 17 formed to be comparatively thick, and a lid surface portion 20 formed to be thinner than the side wall portion 17 and coupled to the side wall portion 17 through a coupling portion 19.

The receiving case 16 is made of a material, such as polyethylene polypropylene, ABS and polyvinyl chloride, which is comparatively high in hardness in order to keep the shape of the case over a long period and which has good ductility in order to prevent the gas bag 10 from being damaged by a fracture surface at the inflation of the gas bag 10.

The receiving case 16 is accommodated in a space portion which is encircled by the central portion 4 and rising side wall portions 5 of the bracket 3. It is fixed in such a manner that the side wall portion 17 is attached to fittings with screws 13 mounted on rising side rising wall portions 5 and that supporting pieces 18 integrally added to the inside surface of an end part of the side wall portion 17 are fastened by clamps 14 secured to the bracket 3 through bolts 15.

As shown by broken lines in FIG. 1, the lid surface portion 20 is formed with mutually contiguous fragile portions 21 in a plurality of places extending radially. In the illustrated embodiment, the fragile portion 21 has a construction in which slits are intermittently formed.

In the illustrated embodiment, the outside of the lid surface portion 20 is depressed. A pad 23 which is made of a material retaining flexibility and being prone to rupture is bonded to the depressed portion 22.

The rising side wall portion 5 of the bracket 3 is formed with flange pieces 6 which are bent outwards. The side wall portion 17 of the receiving case 16 is additionally provided with cover pieces 24 each of which is formed with a through-hole 25 and can cover the flange piece 6. A klaxon 26 is mounted on the flange piece 6 in such a manner that a push button 27 faces to the through-hole 25.

According to the inflating type occupant restraint device of the above construction, when the gas generator 8 operates to generate large quantities of high pressure gas, the gas bag 10 inflates suddenly. Owing to the inflating force, the receiving case 16 is ruptured and cloven open at the fragile portions 21 formed in the lid surface portion 20. Simultaneously therewith, the pad 23 is also ruptured and cloven open.

Figure 2:
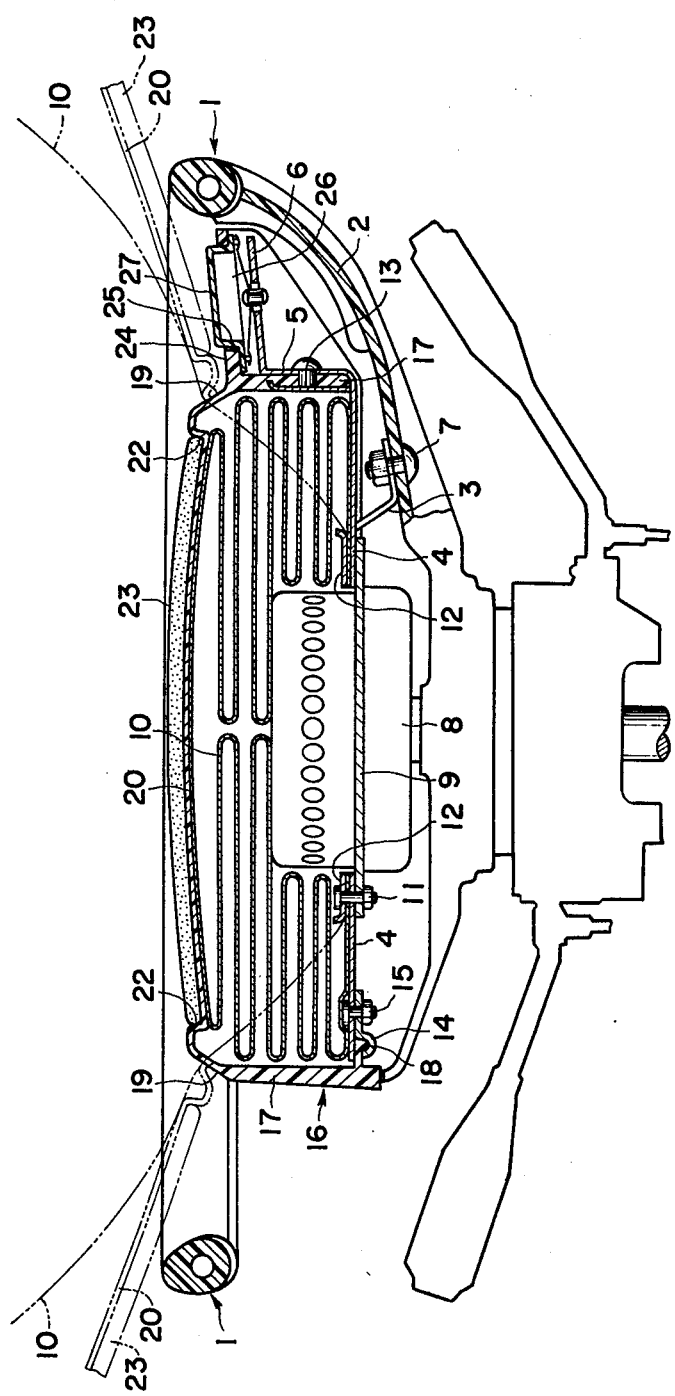
FIG. 2 is a sectional view taken along line II—II in FIG. 1.

As shown by chain lines in FIG. 2, the lid surface portion 20 which has been ruptured and cloven open at the fragile portions 21 is bent and expanded in the form of petals at the coupling portion 19 which couples the thick side wall portion 17 and the thin lid surface portion 20. As the result, the receiving case 16 is prevented from scattering in small pieces.

Description will now be made of another embodiment shown in FIG. 3. In this embodiment, the receiving case 16 is constructed of a special material.

Selected and employed as the material of the receiving case 16 is a thermoplastic elastomer which has the properties of a brittle point of below −50° C. and a flexural rigidity of 1,000 − 3,000 kg/cm² as specified in the following table:

TABLE

| Items | Test Method | Units | values |
|---|---|---|---|
| Brittle point | ASTM D746 | ° C. | below −50 |
| Flexural rigidity | ASTM D746 | kg/cm² | 1,000–3,000 |

The properties have been determined in consideration of points as stated below.

The gas bag 10 needs to operate instantly at a collision and inflate very rapidly in order to protect an occupant from any injury at the collision.

Accordingly, the speed at the time when the gas bag 10 bursts through the receiving case 16 is as high as 100 m/sec.

It is expected that the service atmosphere temperature of the receiving case 16 will become below -30° C. and above 90° C. in the worst case. Even under such service condition, it is necessary that the fracture surfaces of the lid surface portion 21 are ruptured by the burst-out of the gas bag 10 at the high speed without giving rise to any sharp edge as to damage the gas bag 10, and that the supporting pieces 18 of the side wall portion 17 are not broken but that mainly the coupling portion 19 between the side wall portion 17 and the lid surface potion 20, etc. bend pliably by approximately 180 degrees. With a material whose low-temperature brittle point is above -50° C., the receiving case 16 causes brittle fracture and scatters when the gas bag 10 operates at a low temperature. With a material whose flexural rigidity is above 3,000 kg/cm², the receiving case 16 is difficult to rupture and cannot bend pliably.

Moreover, the receiving case 16 needs to have a suitable rigidity and must not be easily deformable in ordinary use. If the flexural rigidity is below 1,000 kg/cm², it is difficult to hold a stable form.

Materials which satisfy the properties required for the receiving case 16 as described above are thermoplastic elastomers including TPR #1900 (trade name, produced by Uniroyal Inc., in U.S.), TPN NDR 3745 (trade name, produced by Du Pont Inc., in U.S.), KRATON GX 7820 (trade name, produced by Shell Chemical Inc., in U.S.), etc.

The lid surface portion 20 of the receiving case 16 is formed with successive fragile portions 28 at its central part and peripheral edge parts in order that the receiving case 16 may be opened in the form of petals at the inflation of the gas bag 10. In the illustrated embodiment, the fragile portion 28 is formed of a plurality of intermittent slits.

The fragile portions 21 and 28 in the respective embodiments can have any appropriate form which matches with the form of the receiving case 16 and which is enough to smoothly open the receiving case 16 in the shape of the petals at the inflation of the gas bag.

Figure 3:
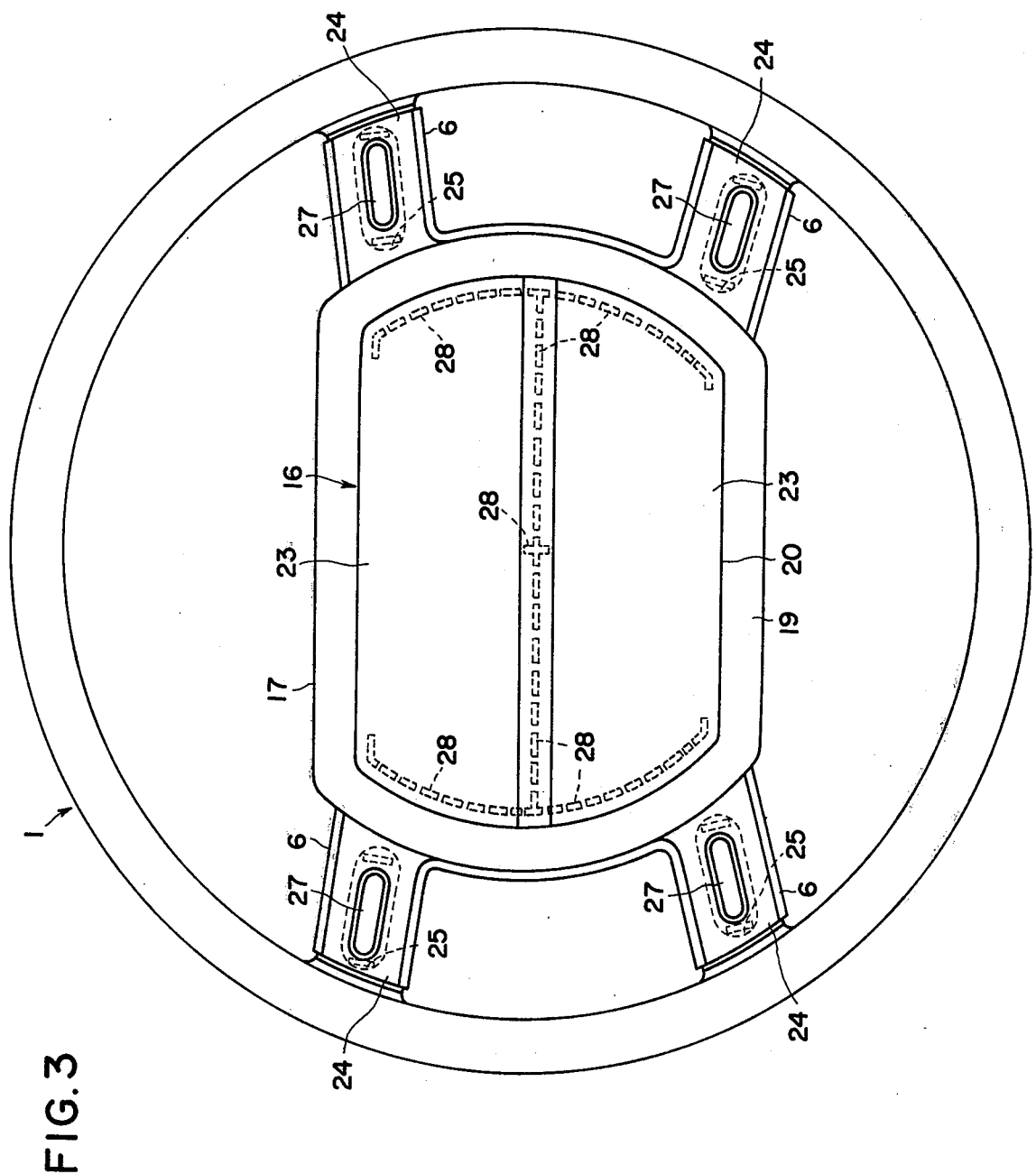
FIG. 3 is a plan view of another embodiment of this invention.

The remaining construction of the embodiment in FIG. 3 is the same as in the previous embodiment in FIGS. 1 and 2.

According to the inflating type occupant restraint device of the construction described with reference to FIG. 3, the fragile portions 28 are formed at the central part and peripheral edge parts of the lid surface portion 20 of the receiving case 16. Therefore, at the inflation of the gas bag 10, the lid surface portion 20 is smoothly ruptured from the fragile portions 28, and the burst-out ports for the gas bag 10 are perfectly opened.

Since the receiving case 16 is made of thermoplastic elastomer having a brittle point of below −50° C. and the flexural rigidity of 1,000 − 3,000 kg/cm², it is ruptured reliably from the predetermined fragile portions 28 of the lid surface portion 20 under any service conditions. Moreover, the lid surface portion 20 having been ruptured from the fragile portions 28 has no crack at any other part and is bent and expanded outwards in the form of petals.

Since the receiving case 16 is formed of the material of the properties previously stated, it retains its pliability and strength under any service conditions. Accordingly, the fracture surfaces of the lid surface portion 20 having been ruptured and cloven open do not involve any harmful sharp edge as to damage the gas bag 10.

Further, since the successive fragile portions 28 are formed at the central part and peripheral edge parts of the lid surface portion 20 of the receiving case 16, the lid surface portion 20 of the receiving case 16 is smoothly ruptured and cloven open from the predetermined fragile portions 28 at the inflation of the gas bag 10. As the lid surface portion 20 is reliably ruptured and cloven open from the predetermined fragile portions 28 owing to the material characteristics previously described, the burst-out ports for the gas bag 10 can be opened more rapidly and perfectly.

Although, in both the embodiments illustrated in the drawings, the occupant restraint device is mounted on the steering wheel 1 for the automobile, it is a matter of course that the invention is not restricted to the illustrated cases but that it can be performed in front of the assistant driver's seat of the vehicle, on the reclining part or rear side of the front seat, etc. as well.

This invention has the construction and operation as described above in detail. The lid surface portion 20 of the receiving case 16 for the gas bag 10 is fractured from the fragile portions 21 formed therein and is cloven open into the form of petals at the inflation of the gas bag 10, and the lid surface portion 20 fractured from the fragile portions 21 does not scatter. The invention therefore achieves the remarkable effect that the gas bag can be operated without injuring the occupant.

Since the receiving case 16 is made of the thermoplastic elastomer having the brittle point of below -50° C. and the flexural rigidity of 1,000 − 3,000 kg/cm², it holds suitable pliability and strength under a wide range of service conditions. In consequence, when the receiving case 16 is ruptured at the inflation of the gas bag 10, the lid surface portion 20 is more reliably fractured and cloven open at the predetermined fragile portions 28, and the fractured lid surface portion 20 does not scatter in the form of broken pieces at all. The invention therefore has the effect that any accident attributed to the scattering of the broken pieces of the receiving case 16 can be prevented under all service conditions.

Since the pliability is retained under the wide range of service conditions, any harmful sharp edge as to damage the gas bag 10 does not arise in the fracture surfaces of the lid surface portion 20 of the receiving case 16, and hence, the occupant does not fear that he will be hurt by the sharp edge in the fracture surface of the lid surface portion 20 of the receiving case 16 at the inflation of the gas bag 10. This is effective in that the stability and reliability of the gas bag 10 can be better enhanced.

What we claim is:

1. An inflating type occupant restraint device for a motor vehicle comprising a case for a gas bag folded up and encased so as to inflate only when a gas generator operates, said case being an integral structure which includes side walls secured to a fixed part of the vehicle and a lid surface portion thinner than said side walls, said lid portion being made of a ductile and comparatively hard material having a series of frangible weakened lines extending radially from near the center of the surface of said lid portion and leading at least to four corners of said lid surface portion, a peripheral portion extending from, raised above, and surrounding said lid portion and connecting it and said side walls, said peripheral portion being thinner than said side walls, and a cover sheet secured to and covering said lid surface portion but not said peripheral portion so as to cover the entire area of said frangible lines, said cover sheet being made of a material which ruptures more easily than said frangible lines.

* * * * *